2 Sheets—Sheet 1.

F. H. KINDL.

APPARATUS FOR ROLLING BEAMS.

No. 11,454. Reissued Nov. 20, 1894.

WITNESSES

A. M. Corwin

W. B. Corwin

INVENTOR

Frederick H. Kindl by H. Bakewell & Son his attorneys

2 Sheets—Sheet 2.

F. H. KINDL.

APPARATUS FOR ROLLING BEAMS.

No. 11,454. Reissued Nov. 20, 1894.

WITNESSES

H. M. Corwin

W. B. Connie

INVENTOR

Frederick H. Kindl by R. Bakewell & Son his Attorneys

UNITED STATES PATENT OFFICE.

FREDERICK H. KINDL, OF PITTSBURG, PENNSYLVANIA.

APPARATUS FOR ROLLING BEAMS.

SPECIFICATION forming part of Reissued Letters Patent No. 11,454, dated November 20, 1894.

Original No. 520,060, dated May 22, 1894. Application for reissue filed October 19, 1894. Serial No. 526,419.

*To all whom it may concern:*

Be it known that I, FREDERICK H. KINDL, of Pittsburg, in the county of Allegheny and State of Pennsylvania, have invented a new and useful Improvement in Apparatus for Rolling Beams, of which the following is a full, clear, and exact description, reference being had to the accompanying drawings, forming part of this specification, in which—

Figure 1:
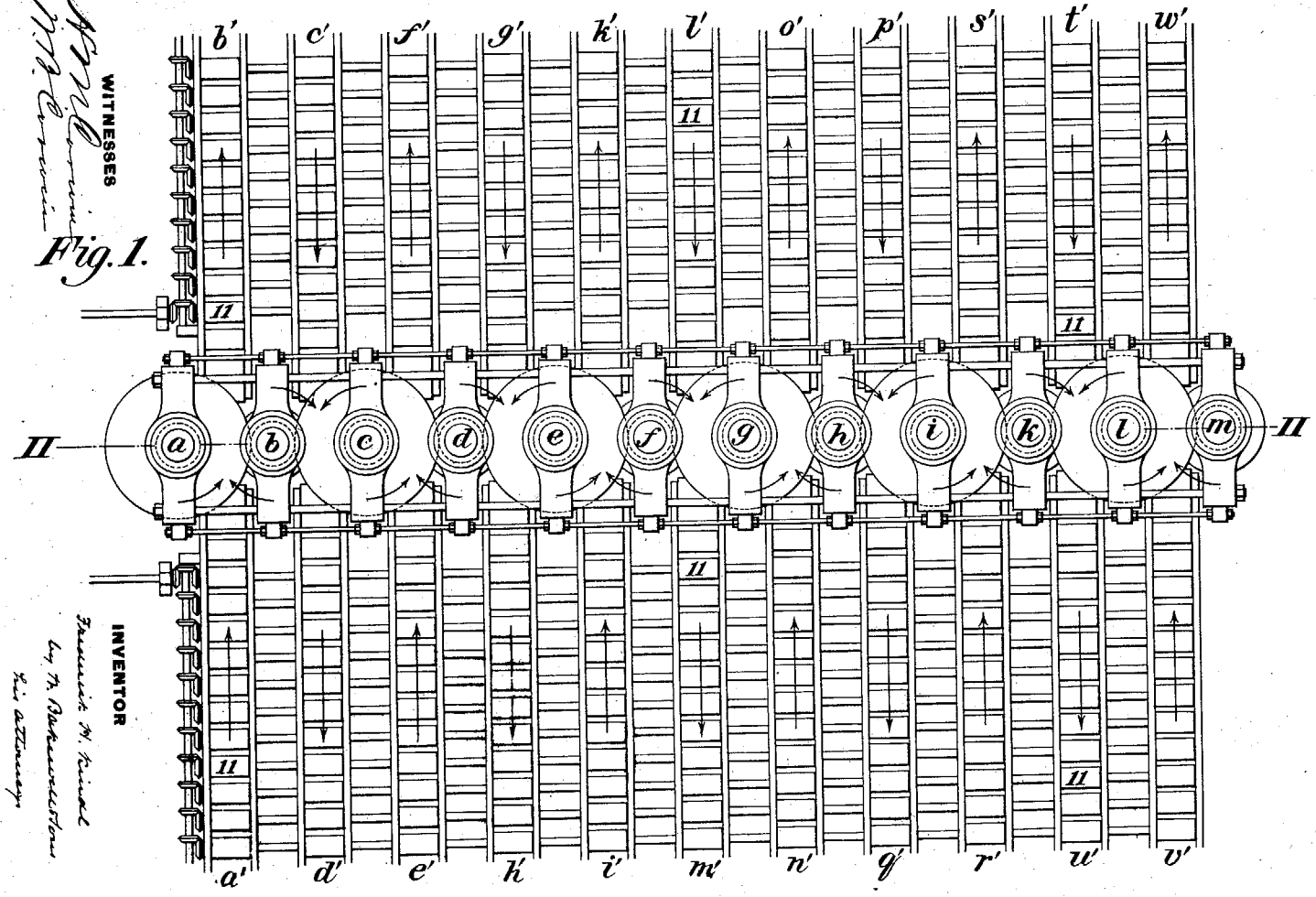
Figure 2:
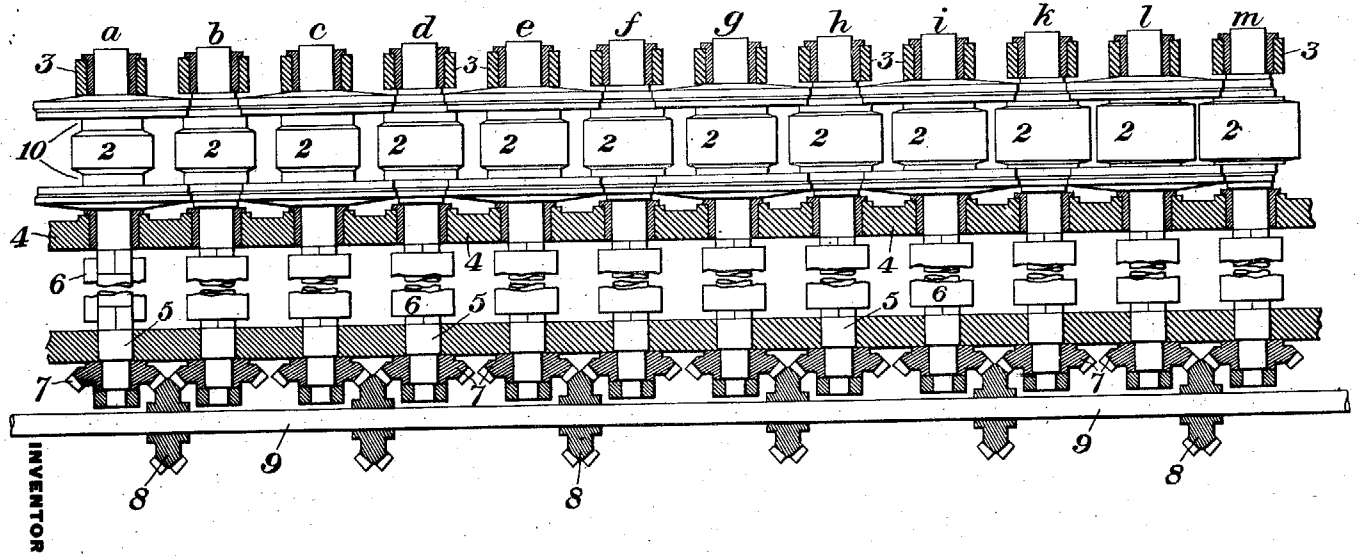

Figure 1 is a plan view of rolls and feed-tables; and Fig. 2 is a vertical sectional view on the line II—II of Fig. 1.

Like symbols of reference indicate like parts in each of the views.

In the drawings, the letters *a* to *m* represent the vertical rolls which are journaled in the housings 3 and 4 and are connected with the driving spindles 5 by the wabblers 6. Keyed to the lower end of the spindles 5 are the bevel-wheels 7, which gear with bevel-wheels 8 on the shaft 9, so that each roll is driven by power directly from the power-shaft. In the face of the rolls 2 are grooves 10, which form the flanges of the beam, and these grooves, as well as the space between the rolls, diminish in size with each pass of the series from *a* to *m*, so as to reduce the thickness of both the flanges and the web of the beam with each pass. On each side of the rolls 2 are the feed-tables *a'* to *w'*, having feed-rollers 11, which are driven by suitable mechanism in the direction of the arrows marked on the drawings. The rolls *a* to *m* are so constructed that they may be adjusted in relation to each other by suitable mechanism, not shown in the drawings, so as to increase or diminish the space between the rolls on any or all of the different passes.

The operation is as follows: The I-beams or channel-beams as they come from the cogging mill are delivered with their webs in a vertical position to the feed-table *a'*, and are passed between the rolls *a b* to the feed-table *b'*. By suitable transfer mechanism, not shown in the drawings, the shape is then transferred to the feed-table *c'* and passed between the rolls *b* and *c*, and so on until the finished beam is delivered on the table *w'*.

The advantages of my invention will be apparent to those skilled in the art. The rolls are much cheaper, being smaller in length than the horizontal rolls now in general use and hence are easier to replace in case of breakage or change from one shape to another. As one roll is used in two passes a minimum number of rolls is required. They are also much stronger owing to the short distance between their bearings, and, being on the same level, can be easier adjusted than if arranged three-high, as now mostly used. As the rolling is all done on one and the same horizontal plane and the feed-rollers turn in the proper direction, the use of tilting as well as transfer tables is avoided, and a continuous rolling of the shape is accomplished, making it less expensive to roll and increasing the output or tonnage over that of the present method. Each roll is also driven independently by power derived directly from the power shaft. Thus the strains in the connections, wabblers, and rolls are greatly reduced from those existing in the present mills, hence causing less breakage.

Although I have shown rolls adapted to roll I-beams, I do not desire to limit myself thereto, nor do I desire to limit my invention to the use of the particular devices shown and described; it being understood that for channel-beams which are not symmetrical about their vertical axis, suitable means must be provided for turning this shape, so as to set it in proper position for entering the consecutive passes.

I am aware that vertical rolls used singly or in connection with horizontal rolls are not new.

I am also aware that vertical rolls have been used in rolling tubes, and I do not desire to claim the same broadly.

Having thus described my invention, what I claim, and desire to secure by Letters Patent, is—

1. In a rolling-mill plant, the combination of a series of three or more vertical rolls, having grooves adapted to roll channeled beams, the groove of the intermediate rolls being adapted to coact with the grooves on the rolls on each side of it, the faces of the rolls being arranged at a successively less distance apart; substantially as described.

2. In a rolling-mill plant, the combination of a series of three or more vertical rolls, having grooves adapted to reduce channeled beams from their first shape to the finished beam, and a series of horizontal feeding tables having feed rollers arranged to feed the beams through the passes of the rolls, substantially as described.

3. The combination of a series of vertical rolls, and a series of feed-tables, all of which tables are situate in the same horizontal plane; substantially as described.

In testimony whereof I have hereunto set my hand this 15th day of October, 1894.

FREDERICK H. KINDL.

Witnesses:

W. B. CORWIN,

H. M. CORWIN.